United States Patent
Inuganti et al.

(10) Patent No.: US 12,426,129 B2
(45) Date of Patent: Sep. 23, 2025

(54) SYSTEM AND METHOD FOR EXCHANGING BUFFERED DATA

(71) Applicant: ZEBRA TECHNOLOGIES CORPORATION, Lincolnshire, IL (US)

(72) Inventors: Venkata Aneel Kumar Inuganti, Bangalore (IN); Mahesh Kumar Edar, Davenagere (IN); Darpan Majumder, Bangalore (IN); Surya Kantha Rao Kandoti, Bangalore (IN); Mahendiran Balasubramaniyam, Bangalore (IN); Kishore Kumar Pathankanur, Bangalore (IN); Naga Babu Parsi, Bangalore (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 616 days.

(21) Appl. No.: 17/829,043

(22) Filed: May 31, 2022

(65) Prior Publication Data
US 2023/0389127 A1    Nov. 30, 2023

(51) Int. Cl.
*H04W 76/30* (2018.01)
*H04W 52/02* (2009.01)
*H04W 88/12* (2009.01)

(52) U.S. Cl.
CPC ....... *H04W 76/30* (2018.02); *H04W 52/0235* (2013.01); *H04W 88/12* (2013.01)

(58) Field of Classification Search
CPC .. H04W 76/30; H04W 52/0235; H04W 88/12
See application file for complete search history.

(56) References Cited

U.S. PATENT DOCUMENTS

| | | | | |
|---|---|---|---|---|
| 2007/0014259 | A1* | 1/2007 | Fajardo | H04W 36/0019 370/331 |
| 2008/0192698 | A1* | 8/2008 | Rue | H04W 52/0206 370/331 |

OTHER PUBLICATIONS

Matthew Gast, 802.11 Wireless Networks the definitive guide, OReilly, 2005 (Year: 2005) part1.*
Matthew Gast, 802.11 Wireless Networks the definitive guide, OReilly, 2005 (Year: 2005) part2.*

* cited by examiner

*Primary Examiner* — Ayaz R Sheikh
*Assistant Examiner* — David Zhijun Sun

(57) ABSTRACT

A mobile computing device includes: a wireless communications interface configured to connect to a network deployed by one or more access points; a controller for the wireless communications interface, the controller configured to: send a buffer indicator to the network to buffer incoming packets destined for the mobile computing device; move away from a home access point to which the mobile computing device is connected; accumulate outgoing packets destined for transmission to the network while the mobile computing device is away from the home access point; connect to a destination access point; transmit the outgoing packets to the destination access point; and after the outgoing packets are transmitted to the destination access point, send a release indicator to the network to release the buffered incoming packets for the mobile computing device.

18 Claims, 4 Drawing Sheets

SYSTEM AND METHOD FOR EXCHANGING BUFFERED DATA

BACKGROUND

Wireless networks may be serviced by several access points to which mobile devices can connect based on their location within the wireless network. As users of mobile devices move around, the mobile devices may scan for different access points to which to connect and roam to access points with better connections. While the mobile devices scan or roam, they move away from their home access point temporarily and data packets are buffered by the mobile device and the network to be exchanged when the mobile device reconnects to an access point. However, the exchange of buffered data packets often causes channel congestion.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
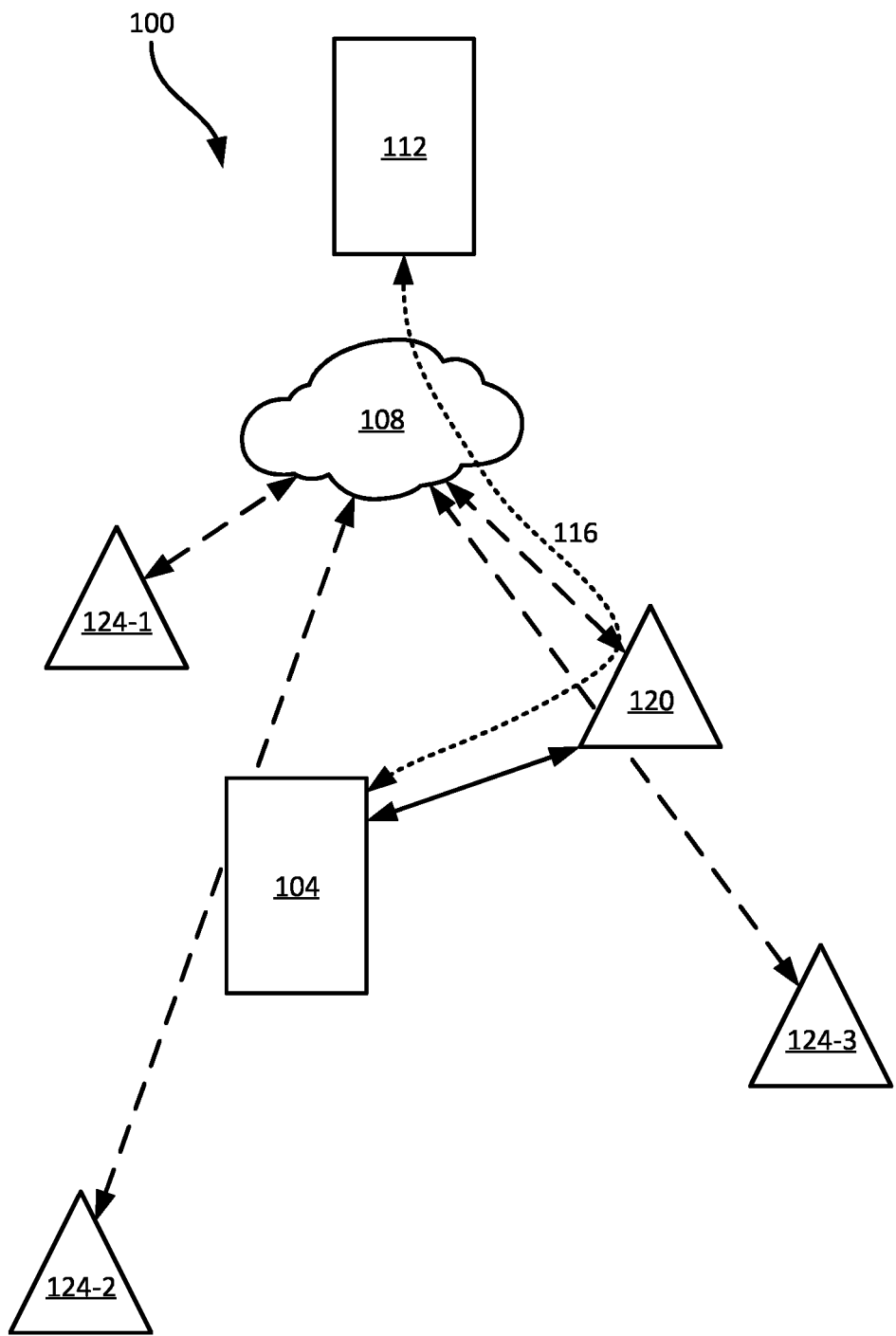
FIG. 1 is a schematic diagram of a system for exchanging buffered data.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a mobile computing device comprising: a wireless communications interface configured to connect to a network deployed by one or more access points; a controller for the wireless communications interface, the controller configured to: send a buffer indicator to the network to buffer incoming packets destined for the mobile computing device; move away from a home access point to which the mobile computing device is connected; accumulate outgoing packets destined for transmission to the network while the mobile computing device is away from the home access point; connect to a destination access point; transmit the outgoing packets to the destination access point; and after the outgoing packets are transmitted to the destination access point, send a release indicator to the network to release the buffered incoming packets for the mobile computing device.

Additional examples disclosed herein are directed to a method comprising: sending, by a mobile device connected to a network, a buffer indicator to the network to buffer incoming packets destined for the mobile computing device; moving away from a home access point to which the mobile device is connected; accumulating, at the mobile device, outgoing packets destined for transmission to the network while the mobile computing device is away from the home access point; connecting to a destination access point; transmitting, by the mobile device, the outgoing packets to the destination access point; and after the outgoing packets are transmitted to the destination access point, sending, by the mobile device, a release indicator to the network to release the buffered incoming packets for the mobile computing device.

Additional examples disclosed herein are directed to a system comprising: a network deployed by one or more access points; a mobile device including: a wireless communications interface configured to connect to the network; a controller for the wireless communications interface, the controller configured to: send a buffer indicator to the network to buffer incoming packets destined for the mobile computing device; move away from a home access point to which the mobile computing device is connected; accumulate outgoing packets destined for transmission to the network while the mobile computing device is away from the home access point; connect to a destination access point; transmit the outgoing packets to the destination access point; and after the outgoing packets are transmitted to the destination access point, send a release indicator to the network to release the buffered incoming packets for the mobile computing device.

FIG. 1 depicts a system 100 in accordance with the teachings of this disclosure. The system 100 includes a mobile computing device 104 (also referred to herein as simply the device 104) connected to a network 108. The device 104 may communicate with a second computing device 112 via a link 116 which traverses the network 108. In some examples, the device 112 may be remote from the device 104 and the link 116 may therefore additionally traverse one or more wide-area networks such as the Internet, mobile networks and the like.

The device 104 may be a mobile computing device such as a handheld computer, a mobile phone, a tablet, a barcode scanner, or the like. As noted above, the device 104 is connected to the network 108, which may be deployed for wireless communications within a facility, such as a transportations and logistics facility, a warehouse, retail establishment, or other facility. Accordingly, the network 108 may be a wireless local area network (WLAN) deployed by one or more access point. In the present example, four example access points, a home access point 120, and three foreign access points 124-1, 124-2, and 124-3 are depicted. In other examples, the network 108 may include more or fewer access points.

In particular, the device 104 may be currently serviced by the home access point 120 to connect to the network 108. Since the device 104 is mobile, the device 104 may be carried about by a user. As the user of the device 104 moves about the facility or other region serviced by the network 108, the connection of the device 104 to the home access point 120 may weaken, and the device 104 may be better serviced by another foreign access point 124 of the network 108. Accordingly, the device 104 may roam to one of the foreign access points 124 to connect to the network 108, for example when the device 104 is out of range of the home access point 120 and/or when a better connection may be achieved via one of the foreign access points 124.

To roam to a foreign access point 124 from the home access point 120, the device 104 may periodically scan for foreign access points 124 to which it may connect. For example, in the presently illustrated example, the device 104 is closer to the access point 124-1, and hence a scan for foreign access points may select the access point 124-1 as a new access point to utilize to connect to the network 108. While the device 104 scans for foreign access points 124, the device 104 may temporarily move away from the home access point 120, and hence any communications and data transmissions to and from the device 104 may be temporarily disrupted. Accordingly, to maintain data transmissions, the home access point 120 may buffer incoming data packets destined for the device 104. Similarly, the device 104 may accumulate outgoing data packets while it is away from the home access point 120.

Additionally, upon completion of the scan, the device 104 may select one of the foreign access points 124 as a new home access point with which to connect (e.g., in the present example, access point 124-1). The device 104 may then move away from the home access point 120 to connect to the access point 124-1. Communications and data transitions to and from the device 104 may similarly be temporarily disrupted. Accordingly, to maintain data transmissions, the new access point 124-1 and the device 104 may buffer incoming and outgoing data packets, respectively. As used herein, when the device 104 moves away from the home access point 120 for off-channel operations, the device 104 may be said to disconnect from the home access point 120.

When the device 104 connects to its destination access point (i.e., either the home access point 120 during a scan, or the new access point 124-1 during a transition) after the off-channel operations, the destination access point releases the buffered incoming data packets to the device 104 and the device 104 transmits the accumulated outgoing data packets to the destination access point. However, the release of both the incoming and outgoing data packets simultaneously may cause channel congestion, and hence in accordance with the present disclosure, as will be described further herein, the device 104 may first transmit the accumulated outgoing data packets, and then send a release indicator to the destination access point to release the incoming packets after the outgoing packets are transmitted.

Figure 2:
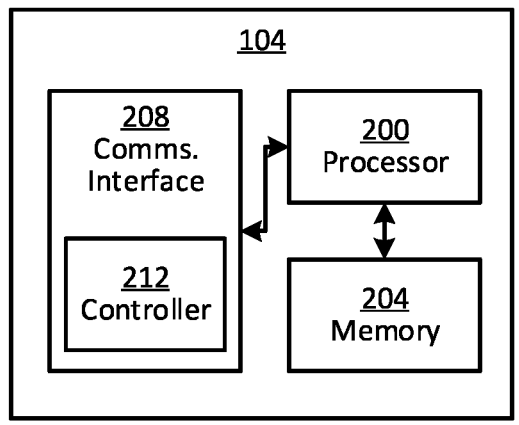
FIG. 2 is a block diagram of certain internal hardware components of the mobile device of FIG. 1.

Turning now to FIG. 2, certain internal components of the computing device 104 are illustrated. The device 104 includes a processor 200 interconnected with a non-transitory computer-readable storage medium, such as a memory 204. The memory 204 includes a combination of volatile memory (e.g. Random Access Memory or RAM) and non-volatile memory (e.g. read only memory or ROM, Electrically Erasable Programmable Read Only Memory or EEPROM, flash memory). The processor 200 and the memory 204 may each comprise one or more integrated circuits. The memory 204 stores computer-readable instructions for execution by the processor 200, including one or more applications which, when executed, configure the processor 200 to perform the various functions of the device 104.

The device 104 further includes a communications interface 208 enabling the device 104 to exchange data with other computing devices, such as the device 112. The communications interface 208 is interconnected with the processor 200. The communications interface 208 includes a controller 212, and one or more antennas, transmitters, receivers, or the like (not shown), to allow the device 104 to communicate with other computing devices such as the device 112 via the link 116. The controller 212 may be a micro-controller, a micro-processor, or other suitable device capable of executing computer-readable instructions to control the components, such as the antennae, transmitters, receivers, and the like, of the communications interface 208 to perform the functionality described herein. The controller 212 may comprise one or more integrated circuits and may include and/or be interconnected with a non-transitory computer-readable storage medium storing computer-readable instructions which when executed configure the controller 212 and/or the communications interface 208 to perform the functionality described herein.

The device 104 may further include one or more input and/or output devices (not shown) suitable to allow an operator to interact with the device 104. The input devices may include one or more buttons, keypads, touch-sensitive display screens or the like for receiving input from an operator. The output devices may further include one or more display screens, sound generators, vibrators, or the like for providing output or feedback to an operator.

Figure 3:
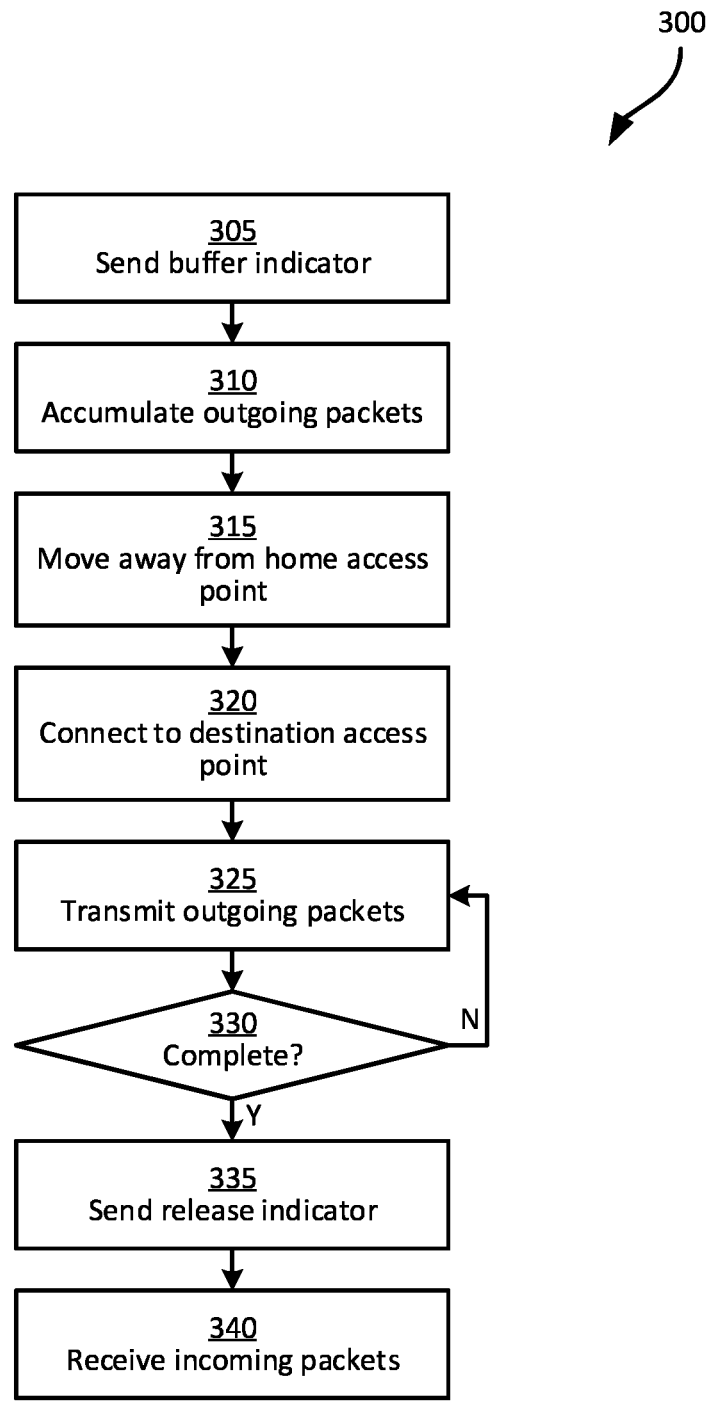
FIG. 3 is a flowchart of a method for exchanging buffered data.

Turning now to FIG. 3, the functionality implemented by the device 104 will be discussed in greater detail. FIG. 3 illustrates a method 300 of exchanging buffered data after roaming in accordance with the present disclosure. The method 300 will be discussed in conjunction with its performance in the system 100, and particularly by the communications interface 208 and the controller 212 of the device 104. In particular, the method 300 will be described with reference to the components of FIGS. 1 and 2. In other examples, the method 300 may be performed by the processor 200 rather than the controller 212, and/or by other suitable devices.

The method 300 is initiated at block 305, where the device 104 sends a buffer indicator to the network 108 to buffer incoming packets destined for the device 104. In particular, the device 104 may send the buffer indicator to the home access point 120 to which the device 104 is currently connected. The buffer indicator indicates to the network 108 that incoming packets destined for the device 104 should be buffered and accumulated for subsequent transmittal at one of the access points 120, 124. In particular, the destination access point to which the device 104 will subsequently connect may be designated as the access point at which the incoming packets are buffered. Accordingly, in addition to the buffer indicator, the device 104 may additionally send, at block 305, an indication of the destination access point. For example, if the device 104 is performing a scan, the device 104 may indicate the home access point 120 as the destination access point. If the device 104 is roaming to a new access point 124-1, then the device 104 may indicate the access point 124-1 as the destination access point. The direction of the incoming packets to the destination access point may be controlled, for example by a network controller, by a controlling access point, by the access points of the network 108 in cooperation, or the like.

In some examples, the buffer indicator may be integrated with an outgoing packet transmitted from the device 104 to the network 108, and in particular, to the home access point 120 to which the device 104 is presently connected. The buffer indicator may be a particular value in a field of the data packet (e.g., metadata of the data packet), in accordance with industry standards. In particular, the buffer indicator may be a SET value (i.e., a value of 1) for the power save bit of a data packet header. That is, the device 104 may send, as the buffer indicator, a data packet with the power save bit designated as SET. In particular, the data packet may be an outgoing data packet carrying data transmissions from the device 104 (e.g., an outgoing voice packet during a voice call). In other examples, other suitable buffer indicators are contemplated.

As a result of receiving the buffer indicator from the device 104, as well as an indication of the destination access point, the network 108 may begin to buffer incoming data packets destined for the device 104 at the destination access point. Additionally, in response to sending the buffer indicator, at block 310, the device 104 may begin to accumulate outgoing data packets.

Accordingly, since both incoming packets and outgoing packets are buffered at the destination access point and the device 104 respectively, at block 315, the device 104 may move away from the home access point 120 to which it is currently connected. The incoming packets destined for the device 104 may continue to be buffered at the destination access point and the outgoing packets may continue to be accumulated at the device 104 while the device 104 is away from the home access point 120.

At block 320, the device 104 connects to the destination access point. That is, the device 104 may reconnect to the home access point 120 after completing a scan, or the device 104 may connect to the newly selected access point 124-1 by roaming to the access point 124-1.

At block 325, the device 104 transmits the outgoing packets which were accumulated at block 310 and while the device 104 was away from the home access point 120 at block 315 to the destination access point. In particular, to reduce channel congestion by exchanging both the accumulated outgoing packets and the buffered incoming packets simultaneously, the outgoing packets may be transmitted by the device 104 to the destination access point prior to the incoming packets being released by the destination access point to the device 104.

In order to maintain the buffering of the incoming packets at the destination access point, the device 104 may send, with each outgoing packet, a further buffer indicator. For example, when the buffer indicator is the power save bit of the data packet, the power save bit may have a value of SET or 1 for each of the outgoing packets accumulated at block 310. In particular, since each data packet contains a power save bit, and a value of RESET or 0 may act as a release indicator, maintaining the power save bit as the SET value may allow the destination access point may continue to buffer incoming packets destined for the device 104 while receiving the buffered outgoing packets from the device 104.

Figure 4:
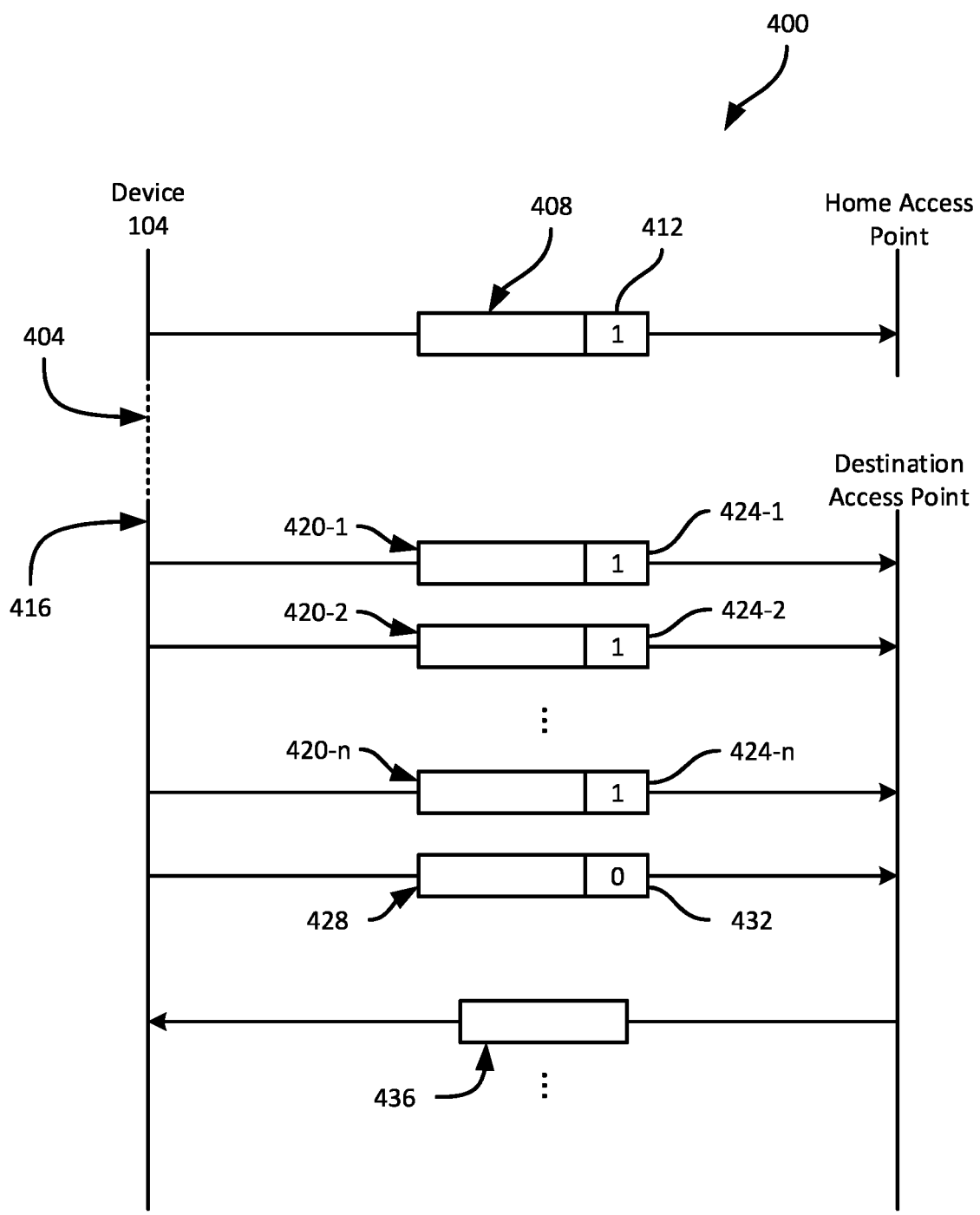
FIG. 4 is a schematic diagram of an example performance of the method of FIG. 3.

For example, referring to FIG. 4, a schematic diagram 400 of the performance of the method 300 is depicted. In particular, prior to moving away at 404 from the home access point, the device 104 may send a data packet 408 with a buffer indicator 412. In the present example, the buffer indicator 412 may be the power save bit of the data packet 408 having a value of 1 (i.e., SET).

After the device 104 has reconnected at 416 to the destination access point, the device 104 sends the accumulated outgoing data packets 420-1, 420-2 . . . 420-*n* to the destination access point. To maintain buffering of the incoming data packets at the destination access point, each of the outgoing data packets 420 may include a respective buffer indicator 424-1, 424-2, . . . 424-*n*. In particular, the buffer indicators 424 may be the power save bit of the data packets 420 having a value of 1 (i.e., SET).

Returning to FIG. 3, at block 330, the device 104 determines whether transmission of the outgoing packets is complete. If the determination at block 330 is negative, the device 104 returns to block 325 to continue transmitting outgoing packets.

If the determination at block 330 is affirmative, the device 104 proceeds to block 335. At block 335, the device 104 sends a release indicator to the network 108, and in particular, to the destination access point to which the device 104 connected at block 320, to release the buffered incoming packets.

In some examples, blocks 325, 330, and 335 may be performed substantially simultaneously, such that the release indicator may be sent with a final outgoing packet. That is, the device 104 may identify, from the accumulated outgoing packets, a final outgoing packet. For example, the device 104 may check, for each outgoing packet transmitted at block 325, whether any further accumulated packets exist at block 330. If no further outgoing packets exist, then the present outgoing packet being transmitted may be identified as the final outgoing packet, and the determination at block 330 may be affirmative. The device 104 may then send, at block 335, the release indicator with the present and final outgoing packet.

That is, referring again to FIG. 4, the device 104 may identify a data packet 428 as the final outgoing data packet (i.e., a final one of the accumulated outgoing packets). The data packet 428 may include a release indicator 432. In the present example, the release indicator 432 may be the power save bit of the final outgoing data packet 428 having a value of 0 (i.e., RESET).

In other examples, blocks 325, 330, and 335 may be performed in sequence. That is, after sending each outgoing packet at block 325, the device 104 may check, at block 330, whether any further outgoing packets exist. When no further outgoing packets exist, the determination at block 330 is affirmative. Since the accumulated outgoing packets are already sent, in order to send the release indicator, the device 104 may generate an empty data packet to transmit and send the release indicator with the empty data packet at block 335. That is, the device 104 may generate a data packet containing no data, but with a power save bit having a value of RESET or 0 to trigger the network 108 to release the buffered incoming packets.

For example, the data packet 428, rather than being the final outgoing data packet, may instead be an empty data packet (i.e., containing no data) with the release indicator 432 being the power save bit of the empty data packet 428 having a value of 0 (i.e., RESET).

Returning again to FIG. 3, at block 340, the device 104 receives the incoming packets from the destination access point. That is, in response to receiving the release indicator at the destination access point, the destination access point releases the buffered incoming packets to the device 104. For example, in FIG. 4, the device 104 may receive incoming packets 436 from the destination access point. As can be seen, sending the release indicator after the accumulated outgoing packets have been transmitted allows the exchanged of the buffered packets (both incoming and outgoing) to be sequential. As will be appreciated, since the outgoing data packets accumulated while the device 104 was moved away have already been transmitted when the incoming packets are received, channel congestion between the device 104 and the destination access point is reduced, thereby increasing the quality of the data packets (e.g., reduced latency, fewer dropped packets, etc.). The device 104 may then re-establish normal communications and data packet transfer.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A mobile computing device comprising:
   a wireless communications interface configured to connect to a network deployed by one or more access points;
   a controller for the wireless communications interface, the controller configured to:
      send a buffer indicator to the network to buffer incoming packets destined for the mobile computing device;
      roam from a home access point to which the mobile computing device is connected;
      accumulate outgoing packets destined for transmission to the network while the mobile computing device is roaming from the home access point;
      connect to a destination access point;
      transmit the outgoing packets to the destination access point; and
      after the outgoing packets are transmitted to the destination access point, send a release indicator to the network to release the buffered incoming packets for the mobile computing device, wherein the controller is further configured to identify, from the accumulated outgoing packets, a final outgoing packet and send the release indicator with the final outgoing packet.

2. The mobile computing device of claim 1, wherein the controller is configured to send the buffer indicator to the home access point to which the mobile computing device is connected to buffer the incoming packets at the destination access point.

3. The mobile computing device of claim 1, wherein the destination access point is the home access point.

4. The mobile computing device of claim 1, wherein the buffer indicator comprises a set value for a power save bit of a data packet and the release indicator comprises a reset value for the power save bit.

5. The mobile computing device of claim 1, wherein the controller is configured to:
after the accumulated outgoing packets are transmitted, generate an empty data packet to transmit; and
send the release indicator with the empty data packet.

6. The mobile computing device of claim 1, wherein the controller is configured to send a further buffer indicator with each of the outgoing packets.

7. A method comprising:
sending, by a mobile device connected to a network, a buffer indicator to the network to buffer incoming packets destined for the mobile computing device;
roaming from a home access point to which the mobile device is connected;
accumulating, at the mobile device, outgoing packets destined for transmission to the network while the mobile computing device is roaming from the home access point;
connecting to a destination access point;
transmitting, by the mobile device, the outgoing packets to the destination access point;
identifying, from the accumulated outgoing packets, a final outgoing packet; and
after the outgoing packets are transmitted to the destination access point, sending, by the mobile computing device, a release indicator with the final outgoing packet to the network to release the buffered incoming packets for the mobile computing device.

8. The method of claim 7, further comprising buffering the incoming packets at the destination access point.

9. The method of claim 7, wherein the destination access point is the home access point.

10. The method of claim 7, wherein the buffer indicator comprises a set value for a power save bit of a data packet and the release indicator comprises a reset value for the power save bit.

11. The method of claim 7, further comprising:
after the accumulated outgoing packets are transmitted, generating an empty data packet to transmit; and
sending the release indicator with the empty data packet.

12. The method of claim 7, further comprising sending a further buffer indicator with each of the outgoing packets.

13. A system comprising:
a network deployed by one or more access points;
a mobile device including:
a wireless communications interface configured to connect to the network;
a controller for the wireless communications interface, the controller configured to:
send a buffer indicator to the network to buffer incoming packets destined for the mobile computing device;
roam from a home access point to which the mobile computing device is connected;
accumulate outgoing packets destined for transmission to the network while the mobile computing device is roaming from the home access point;
connect to a destination access point;
transmit the outgoing packets to the destination access point; and
after the outgoing packets are transmitted to the destination access point, send a release indicator to the network to release the buffered incoming packets for the mobile computing device, wherein the controller is further configured to identify, from the accumulated outgoing packets, a final outgoing packet and send the release indicator with the final outgoing packet.

14. The system of claim 13, wherein the network is configured to buffer the incoming packets at the destination access point.

15. The system of claim 13, wherein the destination access point is the home access point.

16. The system of claim 13, wherein the buffer indicator comprises a set value for a power save bit of a data packet and the release indicator comprises a reset value for the power save bit.

17. The system of claim 13, wherein the controller of the mobile device is configured to:
after the accumulated outgoing packets are transmitted, generate an empty data packet to transmit; and
send the release indicator with the empty data packet.

18. The system of claim 13, wherein the controller of the mobile device is configured to send a further buffer indicator with each of the outgoing packets.

* * * * *